United States Patent [19]

Muramatsu et al.

[11] 4,290,680

[45] Sep. 22, 1981

[54] PHOTOGRAPHIC CAMERA

[75] Inventors: Katsuji Muramatsu; Yoshihiro Fujita, both of Tokyo, Japan

[73] Assignee: Fuji Photo Film Co., Ltd., Japan

[21] Appl. No.: 138,333

[22] Filed: Apr. 8, 1980

[30] Foreign Application Priority Data

Apr. 13, 1979 [JP] Japan .............................. 54-49276[U]

[51] Int. Cl.³ ............................................. G03B 17/00
[52] U.S. Cl. .................................... 354/203; 354/275; 354/288
[58] Field of Search ........................ 354/203, 275, 288

[56] References Cited

U.S. PATENT DOCUMENTS 2,591,417 4/1952 Frye .................................... 354/203

FOREIGN PATENT DOCUMENTS 664401 9/1965 Belgium ............................. 354/202
1185916 1/1965 Fed. Rep. of Germany ...... 354/275
1410051 7/1965 France ................................ 354/275
1086493 10/1967 United Kingdom ................ 354/275

Primary Examiner—Russell E. Adams

[57] ABSTRACT

A film cartridge includes a first container for accommodating unexposed roll film and a second container for taking up exposed roll film, the first and second containers being separably connected with each other. A stationary holding member for holding the second container is mounted on the inner surface of the back lid of a photographic camera. A movable holding member for holding the first container is mounted on the inner surface of the back lid and moved from a first position near the stationary holding member to a second position apart therefrom when the back lid is closed. The film cartridge is held by the movable and stationary holdings members with the first container held by the movable holding member and the second container held by the stationary holding member. The first and second containers can be automatically separated and respectively inserted into the film cavity and the film take-up cavity by closing the back lid.

5 Claims, 6 Drawing Figures

PHOTOGRAPHIC CAMERA

BACKGROUND OF THE INVENTION

1. Field of the Invention

This invention relates to a photographic camera adapted to be loaded with a film cartridge comprising a pair of containers separably connected with each other, one for accommodating unexposed film and the other for taking up exposed film.

2. Description of the Prior Art

There has been known a film cartridge comprising a first container containing unexposed or raw roll film and a second container for taking up exposed film which is separably connected to the first container, as disclosed in Japanese Utility Model Publication Nos. 42(1967)-18594 and 43(1968)-31741.

In loading a photographic camera with such a film cartridge, the first and second containers are separated from each other and respectively inserted into the film cavity and the film take-up cavity of the photographic camera. Also the distance between the containers must be maintained substantially equal to the distance between the film cavity and the film take-up cavity. Conventionally, these operations must be manually carried out and are very troublesome.

SUMMARY OF THE INVENTION

The primary object of the present invention is to provide a photographic camera which permits easy loading of a film cartridge of the above type.

Another object of the present invention is to provide a photographic camera in which a film cartridge of the above type can be loaded without separating the first and second containers from each other in advance.

The photographic camera of the present invention includes a stationary holding member for holding the second container of the film cartridge and a movable holding member for holding the first container. The stationary holding member is mounted on the inner surface of the back lid of the camera, while the movable holding member is slidably mounted on the inner surface of the back lid and is moved between a first position near the stationary holding member and a second position apart therefrom in response to opening and closing of the back lid. When the back lid is opened and the movable holding member is in the first position, the first and second containers can be respectively held by the movable and stationary holding members in their connected state. When the back lid is closed and the movable holding member is moved to the second position, the first container held by the movable holding member is moved away from the second container and separated therefrom. The stationary holding member confronts a film take-up cavity of the camera formed on one side of an aperture for exposure when the back lid is closed. The movable holding member confronts a film cavity formed on the other side of the aperture in the second position. Thus, the first and second containers are automatically separated and inserted into the film cavity and the film take-up cavity respectively by closing the back lid.

A film pressure plate is connected to the movable holding member to be moved together therewith. When the movable holding member is in the first position, the film pressure plate is positioned behind the stationary holding member, and when the movable holding member is in the second position, the film pressure plate is positioned behind the aperture, in which position it supports the roll film.

DESCRIPTION OF THE PREFERRED EMBODIMENT

Figure 1:
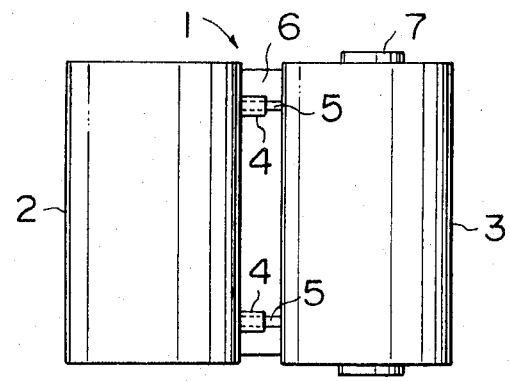
FIG. 1 is a side elevational view of a film cartridge adapted to be loaded in a photographic camera of this invention.
Figure 2:
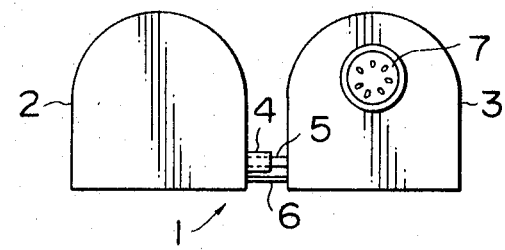
FIG. 2 is a plan view of the film cartridge of FIG. 1.

An example of a film cartridge adapted for use in a photographic camera of this invention is shown in FIGS. 1 and 2.

The film cartridge 1 of this example includes substantially semicylindrical first and second containers 2 and 3. The first container 2 has a pair of arms 4 having a hollow free end portion which project from one side of the first container 2. The second container 3 has a pair of rod-like arms 5 projecting from one side thereof which are press-fitted into the hollow free end portions of the arms 4 of the first container 2 to separably connect the first and second containers 2 and 3 with each other.

A raw or unexposed roll film 6 is contained in the first container 2 with its leading end portion running outside the first container 2 through an elongated outlet slit provided in a side wall thereof and into the second container 3 through an elongated inlet slit provided in the side wall thereof opposing the outlet slit. The leading extremity of the roll film 6 is fixed to a take-up hub 7 rotatably supported within the second container 3. As will be described in detail hereinafter, in loading a photographic camera with the film, the first and second containers 2 and 3 are separated from each other and respectively received in a film cavity and a film take-up cavity of the photographic camera with the roll film 6 extending across an aperture for exposure between the cavities.

Figure 3:
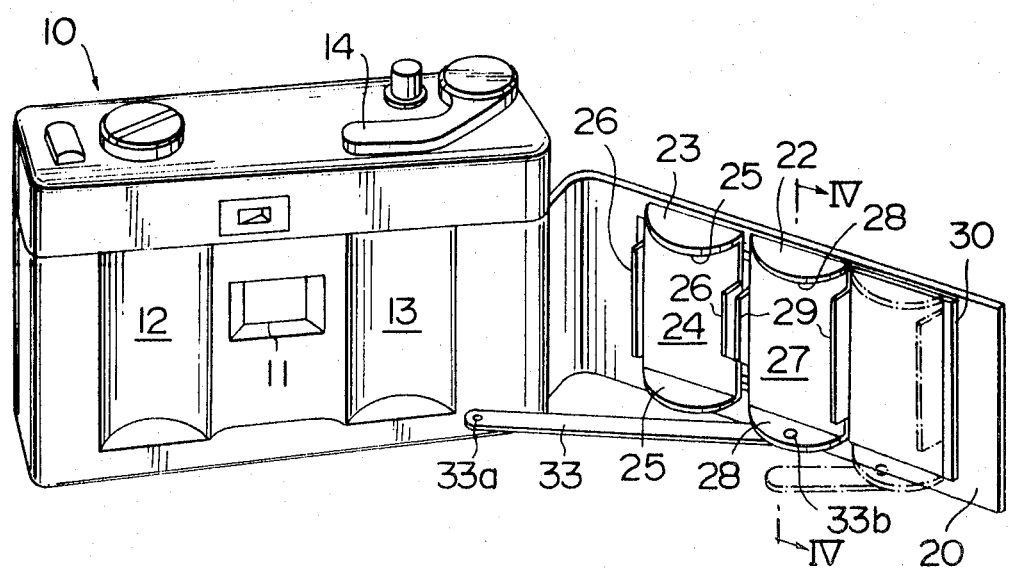
FIG. 3 is a perspective view of a photographic camera in accordance with an embodiment of the present invention shown with its back lid open.

Now referring to FIG. 3, a photographic camera in accordance with an embodiment of the present invention includes a camera body 10 having an aperture 11 for exposure. The camera body 10 is provided with a film cavity 12 and a film take-up cavity 13 formed on opposite sides of the aperture 11. A film wind-up lever 14 is positioned on the upper surface of the camera body 10. A back lid 20 is hinged at its one side edge on the side edge of the camera body 10 adjacent to the film take-up cavity 13.

On the inner surface of the back lid 20 is fixedly mounted a stationary holding member 23 which holds the second container 3 of the film cartridge 1 in such a position that the second container 3 is received in the film take-up cavity 13 when the back lid 20 is closed. Also on the inner surface of the back lid 20 is slidably mounted a movable holding member 22. The movable holding member 22 is positioned in a first position adjacent to the stationary holding member 23 as indicated in solid lines in FIG. 3 when the back lid 20 is open and is moved to a second position away from the stationary holding member 23 as indicated in dotted lines when the back lid 20 is closed. In the second position, the movable holding member 22 is opposed to the film cavity 12 so that the first container 2 of the film cartridge 1 can be inserted into the film cavity 12.

When the back lid 20 is opened and accordingly the movable holding member 22 is in the first position as shown in FIG. 3, the film cartridge 1 can be held by the holding members 22 and 23 with the containers 2 and 3 connected with each other by means of the arms 4 and 5 thereof. When the back lid 20 is closed, the movable holding member 22 is moved to the second position together with the first container 2, whereby the first container 2 is separated from the second container 3 and the roll film 6 contained in the first container 2 is drawn therefrom and is laid over the aperture 11 as will be described in more detail hereinbelow.

The stationary holding member 23 comprises a base plate 24 fixed to the inner surface of the back lid 20, a pair of resilient end walls 25 and a pair of resilient side walls 26, the walls 25 and 26 projecting substantially perpendicularly from the base plate 24. The base plate 24 is spaced from the inner surface of the back lid 20 to provide a space therebetween, the purpose of which will be apparent from the following description.

The second container 3 is pushed into the space surrounded by the walls 25 and 26 and is resiliently gripped by them. The gripping force of the walls 25 and 26 should be large enough to hold the second container 3 in place when the first container 2 is moved away from the second container 3 to be separated therefrom.

Similarly, the movable holding member 22 comprises a base plate 27, a pair of end walls 28 and a pair of side walls 29, the walls 28 and 29 projecting substantially perpendicularly from the base plate 27. The first container 2 is pushed into the space surrounded by the walls 28 and 29 and is resiliently gripped by them. The gripping force of the walls 28 and 29 should be large enough to hold the first container 2 in place when the first container 2 is moved away from the second container 3 to be separated therefrom. It should be appreciated that the height of the side walls 26 and 29 of the holding members 22 and 23 adjacent to each other should be such as to permit the roll film 6 extending between the first and second containers 2 and 3 to clear them.

Figure 4:
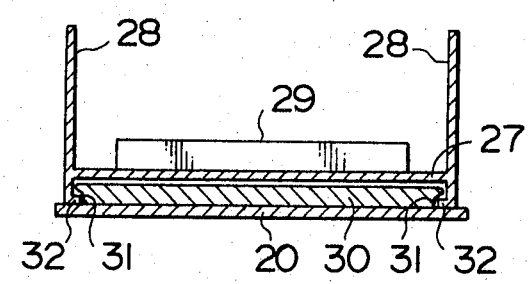
FIG. 4 is a cross sectional view taken along a line IV—IV in FIG. 3, FIGS. 5 and 6 are a perspectively view and a side elevational view, respectively, showing a movable holding member and film pressure plate assembly of the photographic camera of FIG. 3.

Said base plate 27 of the movable holding members 22 is slidably mounted on a guide plate 30 which is secured to the inner surface of the back lid 20. The guide plate 30 has a pair of guide channels 31 (FIG. 4) at its upper and lower surfaces as seen in FIG. 3. As clearly shown in FIG. 4, the end walls 28 of the movable holding member 22 extend below the base plate 27 and are bent inwardly as indicated at 32. The bent end portions 32 of the end walls 28 are respectively engaged with the guide channels 31 of the guide plate 30 so that the movable holding member 22 is moved along the guide channels 31.

As described above, the movable holding member 22 is moved back and forth between said first and second positions in response to opening and closing the back lid 20. This is effected by a lever 33 the ends of which are pivoted on the camera body 10 and the lower end wall 28 of the movable holding member 22 as indicated at 33a and 33b, respectively, as shown in FIG. 3.

Figure 5:
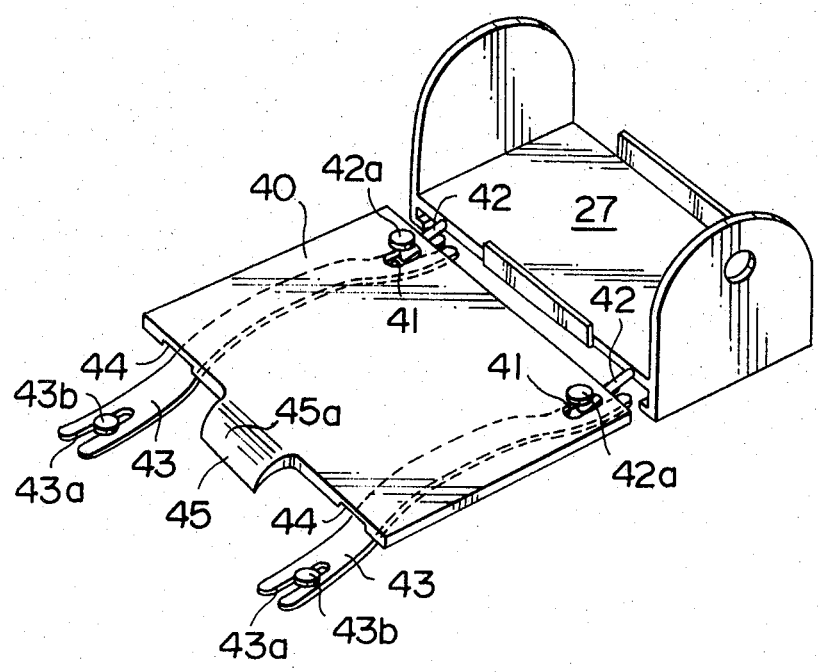
Figure 6:
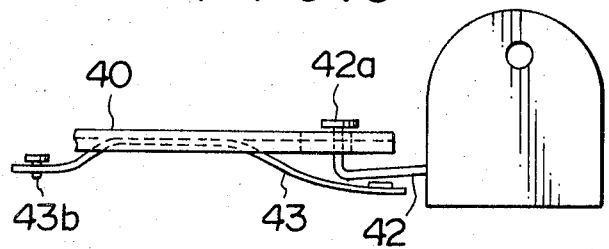

The photographic camera of this embodiment is further provided with a film pressure plate for supporting or backing the roll film 6 extending between the first and second containers 2 and 3 when the movable holding member 22 is in the second position. As shown in FIGS. 5 and 6, the film pressure plate, generally indicated at 40, has a pair of elongated openings 41. A pair of trailing members 42 connected to the base plate 27 of the movable holding member 22 extend horizontally from the base plate 27 and are bent upwardly to be received in the elongated openings 41. Each trailing member 42 has an enlarged head portion 42a at the free end thereof. This arrangement permits vertical movement (as seen in FIG. 6) of the film pressure plate 40 with respect to the movable holding member 22.

A pair of spring plates 43 is secured on the inner surface of the back lid 20 at a position which is opposed to the aperture 11 when the back lid 20 is closed. Said film pressure plate 40 is moved between its inoperative position behind the base plate 24 of the stationary holding member 23 and its operative position opposing the aperture 11 in response to the movement of the movable holding member 22. Each spring plate 43 is fixedly secured to the back lid 20 at one end and slidably secured to the back lid 20 at the other end by means of an elongated slot 43a and a pin 43b having an enlarged head and received in the slot 43a. The intermediate portion of the spring plates 43 is bowed upwardly.

When the movable holding member 22 is moved from the first position to the second position, the film pressure plate 40 is moved to the operative position trailed by the movable holding member 22 and laid over the spring plates 43 to be lifted upwardly as shown in FIGS. 5 and 6.

When the movable holding member 22 is returned to the first position, the film pressure plate 40 is also returned to the inoperative position behind the base plate 24 of the stationary holding member 23 pushed by the movable holding member 22. When the movable holding member 22 is moved to the first position, the spring plates 43 are pressed thereby to be flattened. As can be seen, the film pressure plate 40 is moved up and down when it is moved between the operative position and the inoperative position. This is the reason why the film pressure plate 40 is connected to the movable holding member 22 in such a manner as to permit vertical movement thereof with respect to the movable holding member 22. Further, the film pressure plate 40 is provided with a pair of grooves 44 in the lower surface thereof. Said pair of spring plates 43 are respectively engaged with the grooves 44 to guide the film pressure plate 40 and to position it in the direction transverse to the direction of its movement. The film pressure plate 40 is further provided with an extension 45 which extends from the free end thereof remote from the movable holding member 22 and has a downwardly inclined upper surface 45a. The extension 45 is first engaged with the side surface of the stationary holding member 23 and directs the film pressure plate 40 downwardly, whereby the film pressure plate 40 is easily introduced into the space between the stationary holding member 23 and the back lid 20 when the movable holding member 22 is returned to the first position.

As can be seen from the above description, in the photographic camera of this invention, the film cartridge 1 can be easily loaded in the camera by simply inserting the first and second containers 2 and 3 into the movable holding member 22 and the stationary holding member 23, respectively, without separating them in advance and by closing the back lid 20.

We claim:

1. A photographic camera to be loaded with a film cartridge comprising a first container for accommodating unexposed roll film and a second container for taking up exposed roll film, the first and second containers being separably connected with each other, said photographic camera comprising, an aperture for exposure, a film cavity for receiving the first container formed on one side of the aperture, a film take-up cavity for receiving the second container formed on the other side of the aperture, a back lid which is hinged on one side of the camera body and is opened and closed to open and close the film cavity and the film take-up cavity, a movable holding member for holding one of the first and second containers, a stationary holding member for holding the other of the first and second containers, and means for moving the movable holding member between a first position and a second position in response to opening and closing the back lid, said stationary holding member being fixedly mounted on the inner surface of said back lid at a position confronting one of said cavities in which said other of the first and second containers held thereby is to be received when the back lid is closed, said movable holding member being positioned in the first position when the back lid is opened, and being positioned in the second position when the back lid is closed, in the first position, the movable holding member being positioned near the stationary holding member, thereby permitting the first and second containers to be respectively held in their unseparated state by the corresponding holding members, and in the second position, the movable holding member being positioned away from the stationary holding member, whereby the first and second containers are separated from each other, and confronting the other of said cavities when the back lid is closed.

2. A photographic camera as defined in claim 1 which further comprises a film pressure plate for supporting a part of the roll film positioned behind said aperture, the film pressure plate being connected to said movable holding member to be moved together therewith, whereby the film pressure plate is positioned in its inoperative position in a space formed between said stationary holding member and the inner surface of said back lid when the movable holding member is in the first position, while the film pressure plate is positioned in its operative position behind said aperture when the movable holding member is in the second position.

3. A photographic camera as defined in claim 2 in which said film pressure plate is connected to the movable holding member in a manner permitting movement of the latter with respect to the former in the direction substantially perpendicular to the inner surface of the back lid.

4. A photographic camera as defined in claim 3 in which spring means is provided on the inner surface of said back lid behind the aperture and said film pressure plate is urged toward the aperture by the spring means when moved to said operative position, said spring means being compressed away from the aperture by said movable holding member not to obstruct the path thereof.

5. A photographic camera as defined in any one of the claims 1 to 4 in which said means for moving the movable holding member is a lever pivoted on the camera body at one end and pivoted on the movable holding member at the other end.

* * * * *